(12) United States Patent
Kurokawa

(10) Patent No.: US 8,566,545 B2
(45) Date of Patent: Oct. 22, 2013

(54) STORAGE APPARATUS MOUNTING FRAME, STORAGE EXTENSION APPARATUS, AND METHOD OF CONTROLLING STORAGE APPARATUS

(75) Inventor: Kazushige Kurokawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 192 days.

(21) Appl. No.: 13/041,610

(22) Filed: Mar. 7, 2011

(65) Prior Publication Data

US 2011/0161612 A1 Jun. 30, 2011

Related U.S. Application Data

(63) Continuation of application No. PCT/JP2008/066560, filed on Sep. 12, 2008.

(51) Int. Cl.
*G06F 13/10* (2006.01)
(52) U.S. Cl.
USPC .......................................................... 711/163
(58) Field of Classification Search
None
See application file for complete search history.

(56) References Cited

U.S. PATENT DOCUMENTS

| 5,586,271 | A * | 12/1996 | Parrett | 710/302 |
| 6,970,974 | B2 * | 11/2005 | Isobe et al. | 711/114 |
| 2003/0088780 | A1 * | 5/2003 | Kuo et al. | 713/185 |
| 2003/0103288 | A1 | 6/2003 | Suzuki | |
| 2006/0143476 | A1 * | 6/2006 | McGovern | 713/191 |
| 2009/0038019 | A1 * | 2/2009 | Tatai et al. | 726/34 |

FOREIGN PATENT DOCUMENTS

| JP | 3-164925 | 7/1991 |
| JP | 9-81329 | 3/1997 |
| JP | 10-3362 | 1/1998 |
| JP | 11-24999 | 1/1999 |
| JP | 2003-167681 | 6/2003 |
| JP | 2006-59025 | 3/2006 |
| JP | 2008-21344 | 1/2008 |

OTHER PUBLICATIONS

International Search Report mailed Dec. 16, 2008 for International Application No. PCT/JP2008/066560.

* cited by examiner

*Primary Examiner* — Duc Doan
(74) *Attorney, Agent, or Firm* — Staas & Halsey LLP

(57) ABSTRACT

By having a storage apparatus attachment portion that secures a storage apparatus; a data read prevention processing unit that makes at least a part of data stored in the storage apparatus unreadable; and an input device that inputs a read prevention instruction for the storage apparatus, and configuring such that the data read prevention processing unit makes the data stored in the storage apparatus unreadable in response to a read prevention instruction received from the input device, data on the storage apparatus is reliably and easily set unreadable, as well as preventing data leakage from a typical storage apparatus with lower cost.

10 Claims, 10 Drawing Sheets

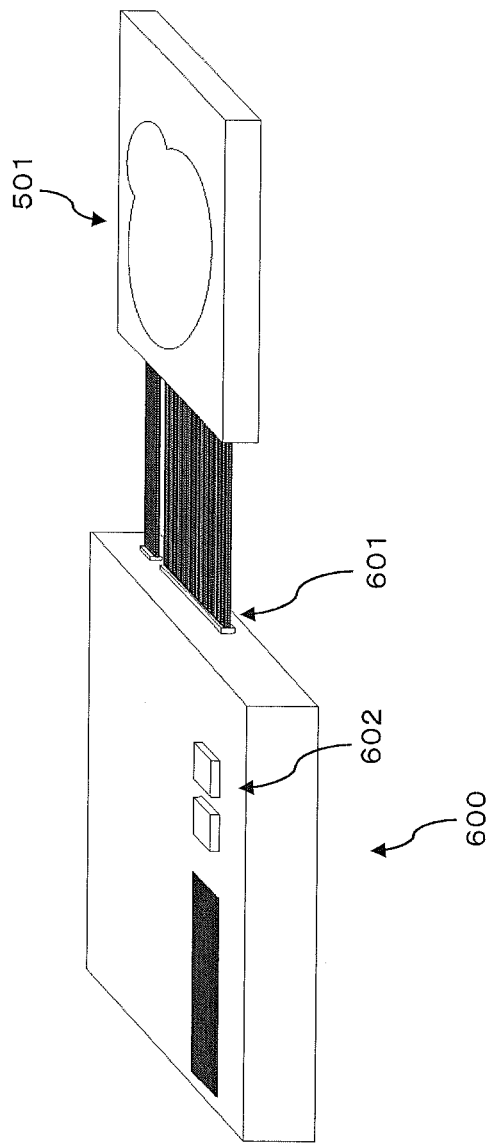

STORAGE APPARATUS MOUNTING FRAME, STORAGE EXTENSION APPARATUS, AND METHOD OF CONTROLLING STORAGE APPARATUS

CROSS-REFERENCE TO RELATED APPLICATION

This application is a continuation Application of a PCT international application No. PCT/JP2008/066560 filed on Sep. 12, 2008 in Japan, the entire contents of which are incorporated by reference.

FIELD

The embodiments discussed herein are related to a storage apparatus mounting frame, a storage extension apparatus, and a method of controlling storage apparatus.

BACKGROUND

Conventionally, as a technique to erase data recorded on a storage apparatus, such as a HDD (Hard Disk Drive) and an SSD (Solid State Drive), techniques have been known in which data erase software is executed on a computer or a special-purpose data erase apparatus is used.

FIG. 9 and FIG. 10 are diagrams illustrating conventional data erase techniques. FIG. 9 is a diagram schematically illustrating the configuration of a computer having data erase software installed thereon. FIG. 10 is a perspective view illustrating the external appearance of a data erase apparatus.

For erasing data in a storage apparatus using data erase software, after installing the data erase software to a computer 500, such as a PC (Personal Computer) or a server, as depicted in FIG. 9, a storage apparatus 501 data of which is to be erased is mounted to the computer 500.

Thereafter, by executing data erase software on the computer 500, the data erase software erase the data in the storage apparatus 501.

A data erase apparatus 600 is an apparatus for data erase in the storage apparatus 501, and is configured to include an interface 601 for connection with the storage apparatus 501, an input switch 602, a processor (not illustrated), a memory (not illustrated) in which a data erase program is recorded, for example, as depicted in FIG. 10.

After attaching a storage apparatus 501, data of which is to be erased, to the interface 601 of the data erase apparatus 600, data erase is carried out in the storage apparatus 501 by entering an instruction to begin data erase from the input switch 602, which causes the processor to execute the data erase program.

Such erase of data in a storage apparatus is carried out to prevent leakage of customer data stored in a HDD to outside when the HDD in the customer's computer system is exchanged during preventive maintenance task of the computer, for example.

However, conventional data erase techniques for erasing data in a storage apparatus using data erase software, for example, as described above have a problem in that data erase cannot be carried out if no data erase software is installed in the computer.

In addition, even if data erase software is installed in a computer having a HDD to be swapped, executing the data erase software on the computer that is currently used is not desirable from the viewpoints of operating jobs and processing speed of the system. The data erase software may erroneously erase data in a HDD which is not intended to be erased or data being used.

Alternatively, data erase software is installed in a mobile computer (notebook PC) or the like of a maintenance engineer, rather than in the operating computer, and a HDD is connected to the maintenance engineer's computer. However, connecting the customer's HDD to the maintenance engineer's notebook PC or the like is not desirable due to the security reasons, such as information leakage or the risk of infection with a computer virus.

On the contrary, if data in the customer's HDD is deleted using the data erase apparatus 600, the maintenance engineer has to bring the data erase apparatus 600 to the customer's premise.

For this purpose, disk drives having a data erase function have been known, for example. In this technique, in response to a switch being operated, a CPU provided in the disk drive executes data erase program to erase data sectors on the disk drive.

Patent Document 1: Japanese Laid-open Patent Publication No. 2003-167681

However, in the above-described technique, data on a disk drive without a data erase function cannot be erased. In addition, power is required to be supplied to the CPU for enabling the data erase function, thus data can be erased only when the disk drive is mounted on a server or a disk array apparatus, which is inconvenient.

SUMMARY

According to an aspect of the embodiment, a storage apparatus mounting frame that is configured to be able to hold a storage apparatus which can store data, and is configured to be removably attached to a storage extension apparatus, the storage apparatus mounting frame includes: a storage apparatus attachment portion that secures the storage apparatus to the storage apparatus mounting frame; an input device that inputs a read prevention instruction for the storage apparatus; a data read prevention processing unit that makes data stored in the storage apparatus unreadable in response to the read prevention instruction inputted from the input device.

In addition, a storage extension apparatus, includes: a storage apparatus that stores data; a storage apparatus attachment portion that secures the storage apparatus to the storage apparatus mounting frame; an input device that inputs a read prevention instruction for the storage apparatus; a data read prevention processing unit that makes data stored in the storage apparatus unreadable in response to the read prevention instruction inputted from the input device.

Furthermore, a method of a storage apparatus that is secured to a storage apparatus mounting frame and that stores data, the method includes: inputting a read prevention instruction for the storage apparatus; and making data stored in the storage apparatus unreadable in response to the read prevention instruction inputted from an input device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 10 is a diagram illustrating a conventional data erase technique.

DESCRIPTION OF EMBODIMENTS

An example of embodiments will be described with reference to the drawings.

(A) Description of First Embodiment

Figure 1:
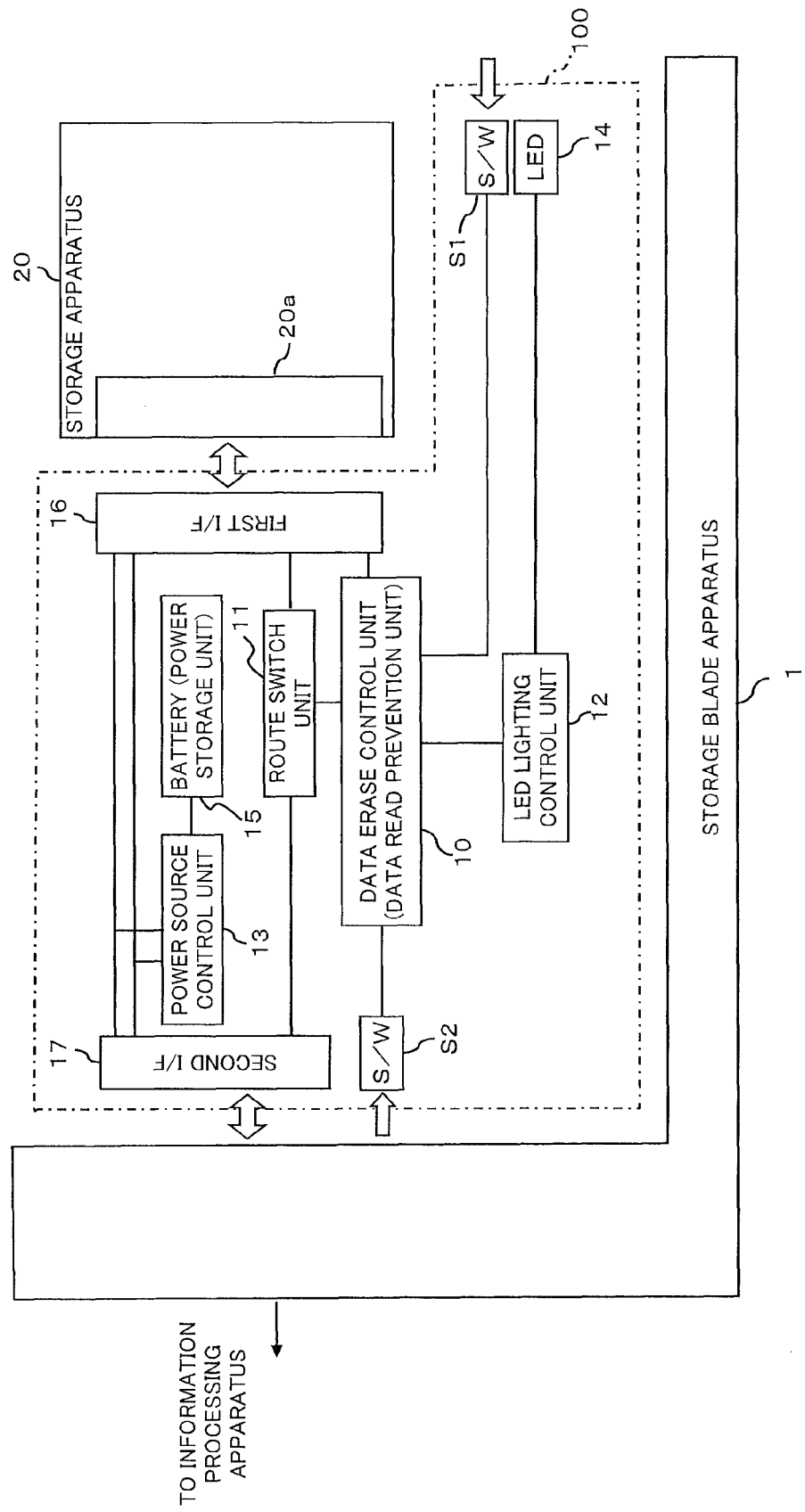
FIG. 1 is a diagram schematically illustrating the functional configuration of a storage apparatus mounting frame as a first embodiment.
Figure 2:
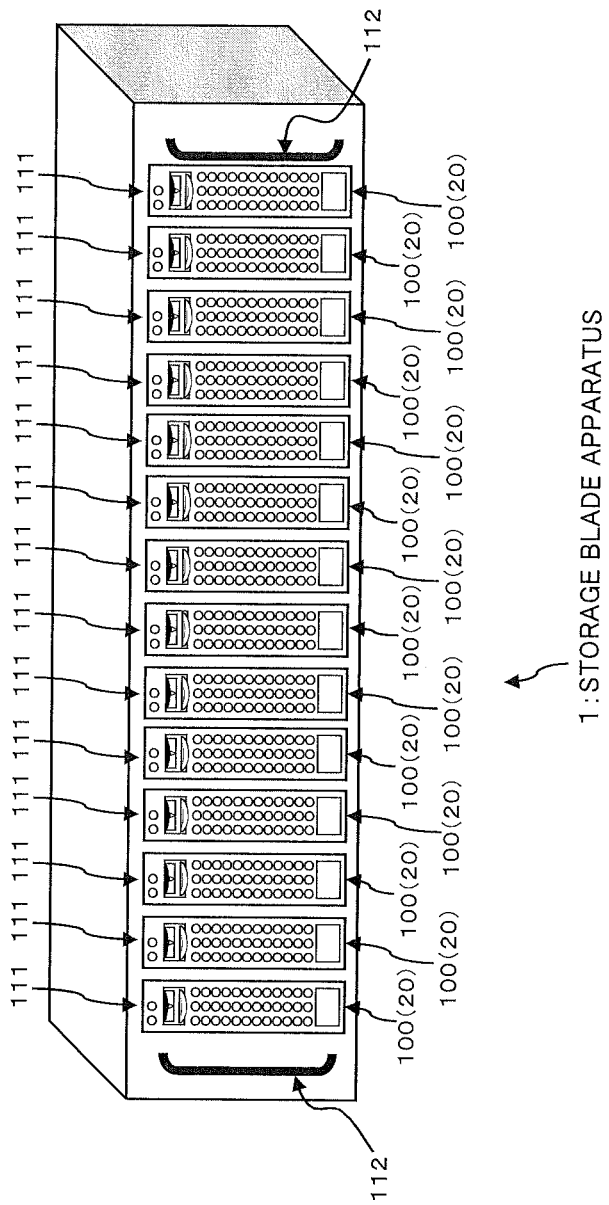
FIG. 2 is a perspective view illustrating an example of a storage blade apparatus to which the storage apparatus mounting frame of the first embodiment is attached.
Figure 3:
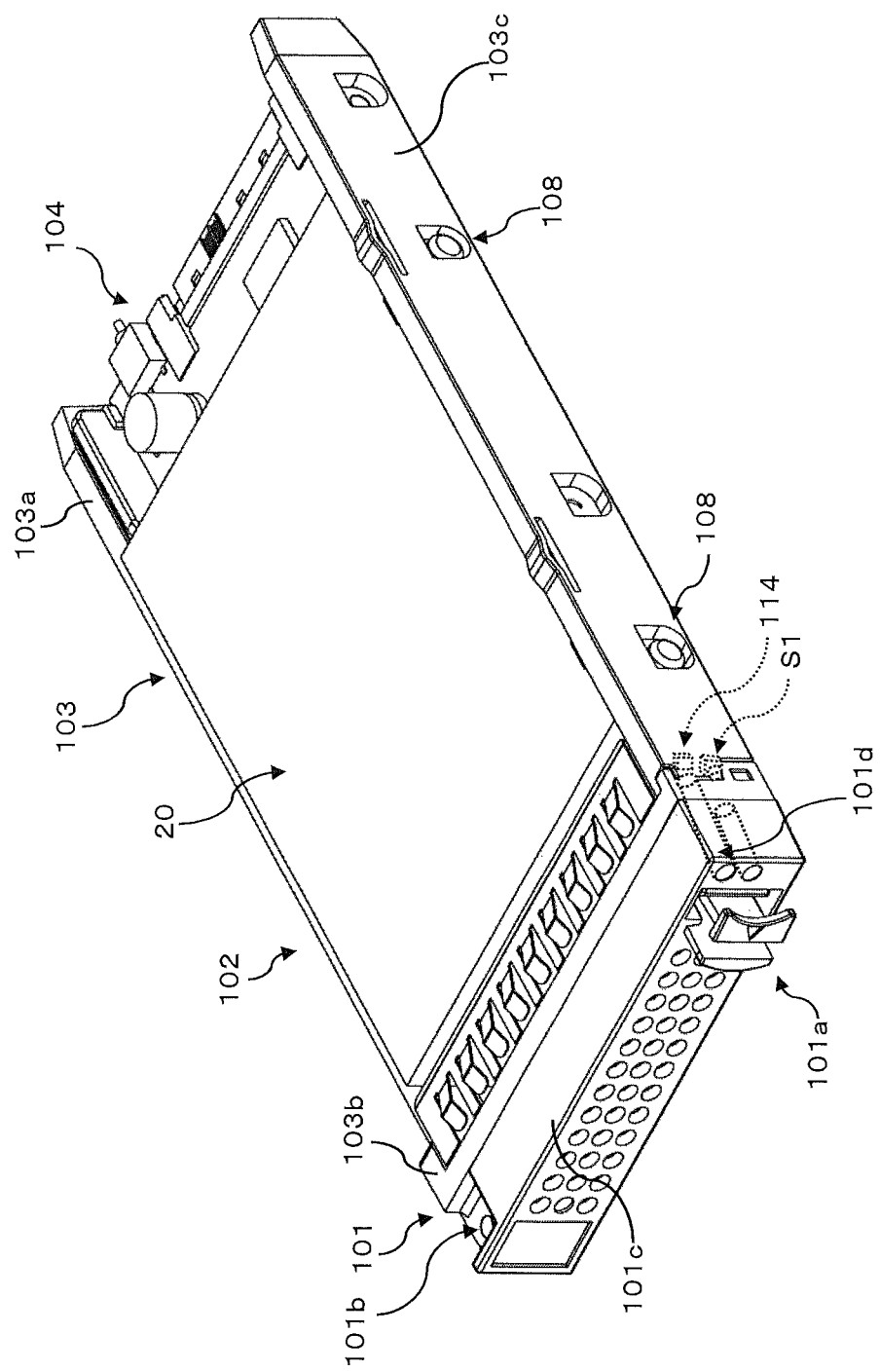
FIG. 3 is a perspective view illustrating an example of the storage apparatus mounting frame of the first embodiment.
Figure 4:
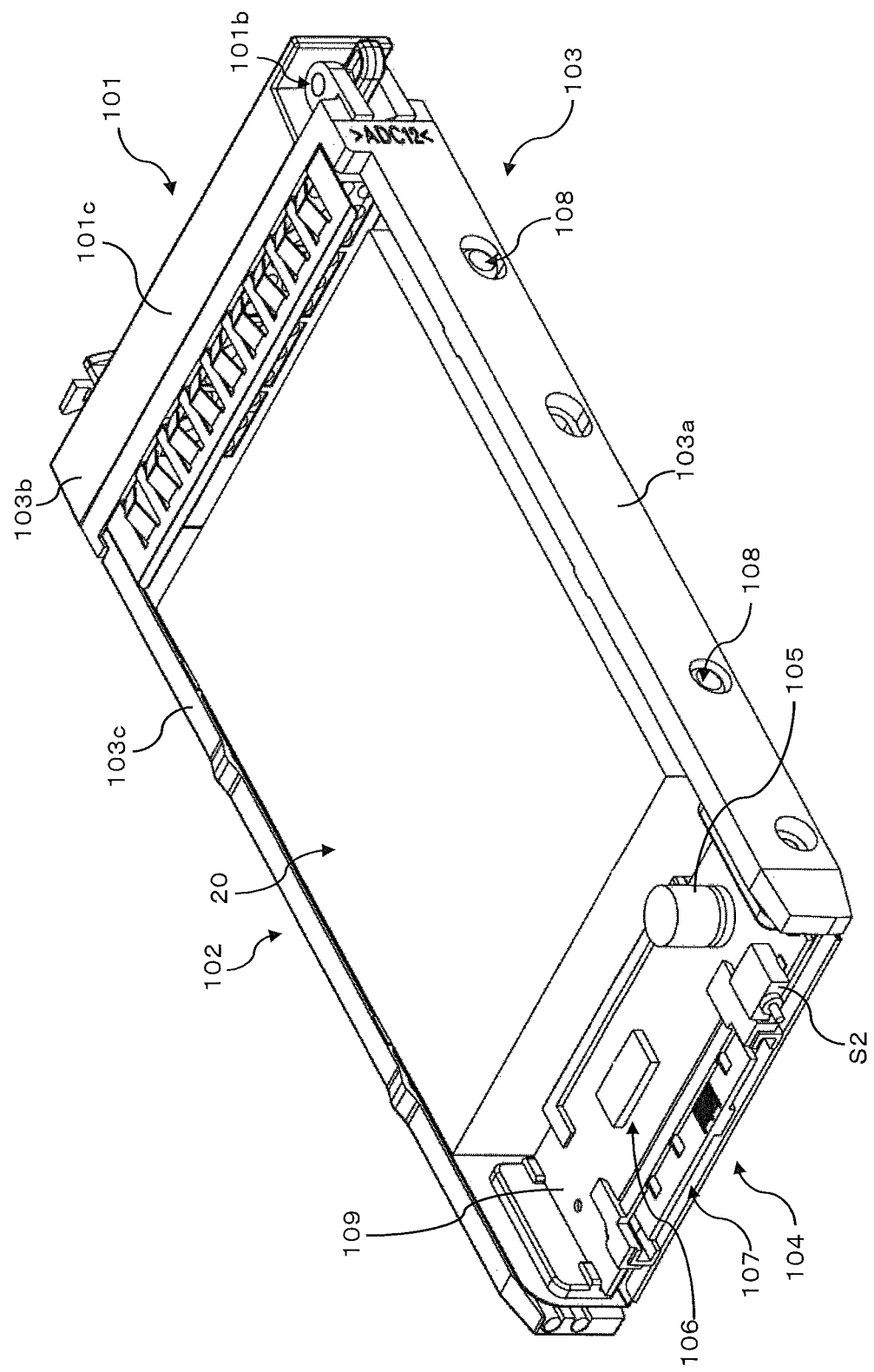
FIG. 4 is a perspective view illustrating an example of the storage apparatus mounting frame of the first embodiment.
Figure 5:
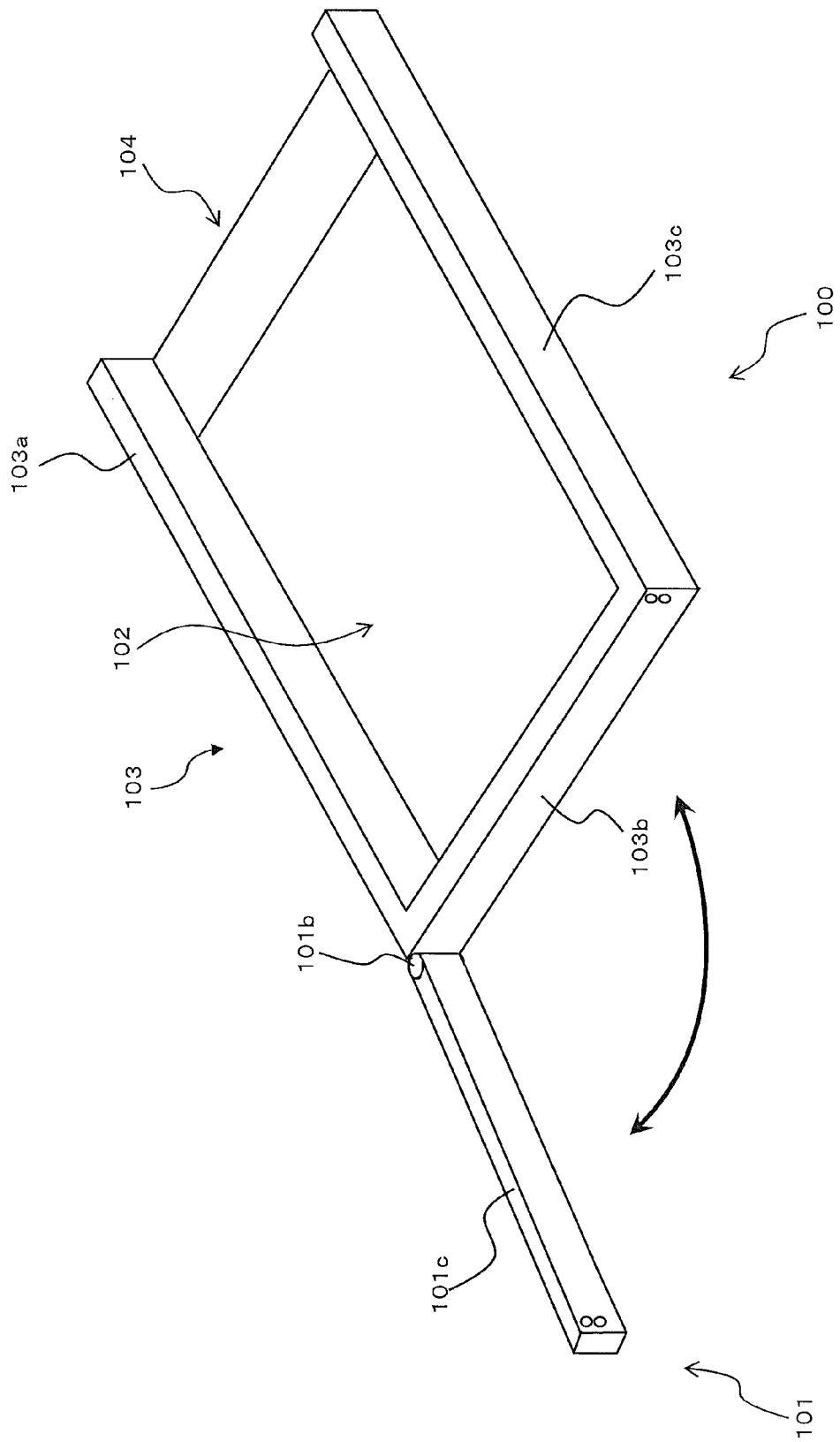
FIG. 5 is a diagram schematically illustrating the configuration of a lever portion of the storage apparatus mounting frame as a first embodiment.

FIG. 1 is a diagram schematically illustrating the functional configuration of a storage apparatus mounting frame as a first embodiment. FIG. 2 is a perspective view illustrating an example of a storage blade apparatus to which the storage apparatus mounting frame of the first embodiment is attached. In addition, FIGS. 3 and 4 are perspectives views illustrating an example of the storage apparatus mounting frame of the first embodiment. FIG. 3 is a perspective view illustrating the front side thereof, and FIG. 4 is a perspective view illustrating the back side thereof. In addition, FIG. 5 is a diagram schematically illustrating the structure of the lever portion thereof. As used therein, a storage blade apparatus refers to is an apparatus in which a plurality of storage blades (HDD units) are mounted in an enclosure, thereby realizing a unified environment of the storage device.

A storage apparatus mounting frame 100 of the first embodiment is configured to be able to hold a storage apparatus 20 and is configured to be removably attached to a storage blade apparatus (storage extension apparatus) 1. The storage apparatus mounting frame 100 communicatively attaches (mounts) the storage apparatus 20 to the storage blade apparatus (storage extension apparatus) 1 by being attached to the storage blade apparatus 1, while the storage apparatus 20 being attached.

In this embodiment, the storage apparatus 20 is a storage apparatus to and from which data can be written or read, and is constructed from a HDD or a SSD, for example.

If a HDD is used as the storage apparatus 20, HDDs compliant with ATA (Advanced Technology Attachment), SATA (Serial Advanced Technology Attachment), SCSI (Small Computer System Interface), SAS (Serial Attached SCSI), and FC (Fibre Channel) standards may be used, for example.

in addition, since any well-known storage apparatuses may be used as the storage apparatus 20, description about their functions and structure will be omitted.

The storage blade apparatus 1 is a storage device that is communicatively connected to an information processing apparatus (such as a server or a host computer), which is not illustrated, for providing the information processing apparatus with disk space. The storage blade apparatus 1 is provided with one or more (14 in the example depicted in FIG. 2) slots 111 having a common size specified by a standard, as depicted in FIG. 2, and a respective storage apparatus mounting frame 100 having a storage apparatus 20 mounted thereto can be inserted into each of the slots 111.

In other words, the storage blade apparatus 1 is configured as a storage device (blade-type storage subsystem) to which a plurality of storage apparatuses can be mounted in higher density by inserting storage apparatus mounting frames 100 (storage apparatuses 20) which are thin as blades having a common size specified by a standard.

The capacity of the disk space can be easily modified by mounting a certain number of storage apparatus mounting frames 100 (storage apparatuses 20) to the slots 111.

In addition, the storage blade apparatus 1 is adapted to be mounted to an enclosure (rack) of the blade server, which is not illustrated, and is configured to have a standard size and dimension. In this embodiment, a blade server refers to a server system to which a plurality of servers can be mounted with higher density by inserting thin servers like blades to a standardized enclosure of having a height of U (unit).

The storage blade apparatus 1 is configured with handles 112, as depicted in FIG. 2, which are grabbed by an operator when the storage blade apparatus 1 is attached or detached to or from the enclosure of the blade server.

A storage apparatus mounting frame 100 is configured to include a frame 103, a lever portion 101, and a board portion 104, as depicted in FIG. 3, and a storage apparatus 20 can be mounted to a storage apparatus mounting unit 102 within the frame 102.

The frame 103 is constructed by arranging frame members 103a, 103b, and 103c in a square C-shape, as depicted in FIG. 5, in which the frame member 103a and the frame member 103c are arranged in parallel while one end of the frame member 103a is connected to one end of the frame member 103b and the other end of the frame member 103 is connected to one end of the frame member 103c.

The space surrounded by the frame members 103a, 103b, and 103c are used as a storage apparatus mounting unit 102 to which the storage apparatus 20 is placed. In addition, when the storage apparatus 20 is mounted in the storage apparatus mounting unit 102, the interface unit 20a of the storage apparatus 20 is connected to first interface (I/F) 16 of the storage apparatus mounting frame 100.

Note that the storage apparatus 20 can be secured to the frame 103 in the storage apparatus mounting unit 102 using a wide variety of techniques. For example, the storage apparatus 20 can be secured to the storage apparatus mounting frame 100 by threading attachment screws (storage apparatus attachment portions) 108 into tapped holes formed in the storage apparatus 20 through attachment holes formed in the frame members 103a and 103c. Various modifications may be practiced without departing the spirit of this embodiment.

In addition, the lever portion 101 is disposed on the frame member 103b on the side opposing to the storage apparatus mounting unit 102.

The lever portion 101 is a structure (lever, handle) which is held when an operator attaches or detaches the storage apparatus mounting frame 100 to or from the storage blade apparatus 1. The lever portion 101 is constructing by pivotably supporting a lever member 101c to one end of the frame member 103b via a support pin 101b, as depicted in FIG. 5, and the lever member 101 is openably attached about the support pin 101b.

In addition, a lock portion 101a is formed on the lever member 101c on the end opposing to the support pin 101b for detachably securing the lever member 101c to the frame member 103b when the lever member 101c is closed.

Note that the lock portion 101a can be embodied in various structures. For example, the lock portion 101a is configured to include a protruding portion (not illustrated) protruding from the lever member 101c toward the frame member 103b, and the protruding portion is configured to engage in an attachment hole (not illustrated) formed in the frame member 101b when the lever member 101c is closed.

In addition, on the frame member 103c near the end on the side of the frame member 103b, an LED (light emitting diode) light emitting module 114 and an operation switch S1 are provided.

The LED light emitting module 114 is controlled to be lit up or out a control chip 106 on the board portion 104, which will be described later. In addition, at the position on the lever member 101c facing the LED light emitting module 114 when the lever member 101c is closed, a light guiding unit 101d for guiding light emitted from the LED light emitting module 114 is formed.

The light guiding unit 101d is formed by providing transparent resin (light guiding plastic) for guiding light inside a hole formed in the lever member 101c, for example, whereby an operator can see that the LED light emitting module 114 is lit up even when the lever member 101c is closed.

The operation switch (switch portion, input device) S1 is a switch that can be operated by an operator, and is made of a push switch, for example. In addition, at the position on the lever member 101c facing the switch S2 when the lever member 101c is closed operation, a hole is formed, for example, through which the operator can operate the operation switch S1 even when the lever member 101c is closed.

In the storage apparatus mounting frame 100, the operator can enter (input) a read prevention instruction by operating the operation switch S1.

In addition, in the storage apparatus mounting frame 100, on the storage apparatus mounting unit 102 on the side opposing to the side of the lever portion 101, the board portion 104 is provided.

The board portion 104 is constructed by providing, on print circuit board 109, devices for embodying various functions (such as controls) in the storage apparatus mounting frame 100, and is configured to include the print circuit board 109, a control chip 106, a power supply control unit 105, the connection detection switch S2, and a connector section 107, as depicted in FIG. 4.

The control chip 106 is for embodying various controls in the storage apparatus mounting frame 100, and is configured as an integrated circuit, such as an ASIC (Application Specific Integrated Circuit) or a FPGA (Field Programmable Gate Array), for example. Note that the functions of the control chip 106 will be described later.

The power supply control unit 105 is adapted to control power supply to various portions in the storage apparatus mounting frame 100. The connection detection switch (switch portion, input device) S2 is a switch for detecting connection between the storage apparatus mounting frame 100 and the storage blade apparatus 1.

For example, the connection detection switch S2 may be constructed from a push switch which is depressed when the storage apparatus mounting frame 100 is inserted and amounted to a slot 111 of the storage blade apparatus 1. Thereby, mounting of the storage apparatus mounting frame 100 to the storage blade apparatus 1 and detachment of the storage apparatus mounting frame 100 from the storage blade apparatus 1 can be detected.

The connector section 107 is an interface that is connected to an interface (not illustrated) provided in a slot 111 of a storage blade apparatus 1 when the storage apparatus mounting frame 100 is inserted into the slot 111. Through the connector section 107, data and control signals are exchanged between the storage apparatus 20 and the information processing apparatus to which the storage blade apparatus 1 is connected. Power is provided from the storage blade apparatus 1 to the storage apparatus mounting frame 100 or the storage apparatus 20 through the connector section 107.

Next, the functions of the storage apparatus mounting frame 100 as the first embodiment will be described with reference to FIG. 1.

The storage apparatus mounting frame 100 is configured to include a data erase control unit (data read prevention processing unit) 10, a route switch unit 11, an LED lighting control unit 12, a power supply control unit 13, an LED 14, a battery (power storage unit) 15, a first interface (I/F) 16, a second interface (I/F) 17, and switches (S/W) S1 and S2, as depicted in FIG. 1.

The battery (power storage unit) 15 is adapted to store power, as well as supplying (outputting) the stored power to outside, and its power storage and power supply is controlled by the power supply control unit 13, which will be described later.

The power supply control unit 13 is adapted to control power supplies to the storage apparatus mounting frame 100 and the storage apparatus 20, and supplies power for the storage apparatus 20 and the control chip 106 (the route switch unit 11, the data erase control unit 10, the LED lighting control unit 12; the derails will be described later) to embody their respective functions, and for the LED 14 to light up.

When the storage apparatus mounting frame 100 is connected to the storage blade apparatus 1 and power is supplied from the storage blade apparatus 1 via the second interface 17, the power supply control unit 13 is adapted to supply the power supplied from the storage blade apparatus 1 to various portions of the storage apparatus mounting frame 100 and the storage apparatus 20. In addition, when no power is supplied to the storage apparatus mounting frame 100 from the storage blade apparatus 1, the power supply control unit 13 is adapted to supply power from the battery 15 to the various portions of the storage apparatus mounting frame 100 and the storage apparatus 20.

In addition, when the storage apparatus mounting frame 100 is connected to the storage blade apparatus 1 and power is supplied from the storage blade apparatus 1 via the second interface 17, the power supply control unit 13 is adapted to supply the power supplied from the storage blade apparatus 1 to the battery 15 for charging the battery 15 (storing electricity) by the power supplied from the storage blade apparatus 1. Furthermore, the power supply control unit 13 is adapted to execute controls, such as preventing overcharge, when charging the battery 15.

Note that, in FIG. 1, power supply lines and the like to supply power to various portions of the storage apparatus mounting frame 100 and the storage apparatus 20 for simplicity.

The power supply control unit 13 and the battery 15 are embodied by the power supply control unit 105 depicted in FIG. 4, for example.

The first interface (I/F) 16 is an interface for connecting between the storage apparatus 20 and the storage apparatus mounting frame 100, and is adapted to be connected to the interface unit 20a of the storage apparatus 20.

In addition, the first interface 16 may include standard interfaces for the storage apparatus 20, such as the ATA, the SATA, the SCSI, the SAS, and the FC, as well as specific interfaces, such as an interface specific to the supplier of the storage apparatus 20.

The second interface (I/F) 17 is an interface for connecting between the storage blade apparatus 1 and the storage apparatus mounting frame 100, and the storage apparatus mounting frame 100 (the storage apparatus 20) is adapted to be connected to the storage blade apparatus 1 and the information processing apparatus via the second interface 17.

In addition, the second interface 17 also includes power supply lines for receiving power from the storage blade apparatus 1, and the storage apparatus mounting frame 100 is adapted to receive power via the second interface 17.

Furthermore, the first interface 16 also includes power supply lines for supplying power to the storage apparatus 20, and power is supplied to the storage apparatus 20 via the first interface 16.

The route switch unit 11 is adapted to switch between connections to the storage apparatus 20. More specifically, the route switch unit 11 is adapted to, in response to an instruction of the data erase control unit 10, connect the information processing apparatus to the storage apparatus 20, or disconnect the connection route between the storage apparatus 20 and the information processing apparatus for connecting the data erase control unit 10 to the storage apparatus 20.

The switch (S/W; input device) S1 is an input switch through which an instruction (read prevention instruction) for starting processing for making data in the storage apparatus 20 unreadable, and is configured by the operation switch S1 depicted in FIG. 3. Hereinafter, the operation switch S1 may be sometimes simply referred to as a switch S1.

The signal (read prevention instruction) entered through a depression of the switch S1 is entered to the data erase control unit 10.

The switch (S/W; input device) S2 is a detachment detection switch for detecting detachment (removal) of the storage apparatus mounting frame 100 from the storage blade apparatus (main apparatus) 1, and is configured by the connection detection switch S2. Note that, hereinafter, the detection switch S2 may be sometimes simply referred to as a switch S2.

The detection signal (read prevention instruction) indicating detachment of the storage apparatus mounting frame 100 from the storage blade apparatus 1, which is detected by the switch S2, is entered to the data erase control unit 10.

The data erase control unit (data read prevention processing unit) 10 is adapted to make at least a part of data stored in the storage apparatus 20 unreadable, and is adapted to perform an interface control for accessing the storage apparatus 20, and a control (data prevention control) for making the data in the storage apparatus 20 unreadable.

In addition, the data erase control unit 10 is adapted to instruct the route switch unit 11 to disconnect a connection between the storage apparatus 20 and the information processing apparatus, when necessary. Specifically, the data erase control unit 10 is adapted to instruct the route switch unit 11 to disconnect a connection between the storage apparatus 20 and the information processing apparatus prior to performing data read prevention control on the data stored in the storage apparatus 20.

In one specific method of the data read prevention control by the data erase control unit 10, the data erase control unit 10 issues a "secure erase" command to the storage apparatus 20 if the storage apparatus 20 supports "secure erase" commands which will be described later.

Note that such "secure erase" commands are supported by storage apparatuses compliant with the SATA standard, for example.

In response to receiving a "secure erase" command, the storage apparatus 20 makes the data in the storage apparatus 20 unreadable by executing at least one of the following processing (1)-(4):

(1) A user area in the storage apparatus 20 is overwrite erased by writing predefined overwriting data (data pattern; for example, insignificant data) for a certain times.

(2) When the storage apparatus 20 is an SSD, entire erase for all areas are performed.

(3) The storage apparatus 20 includes an encryption function for encrypting stored data. When the data concerned is encrypted, decoding of the data is prevented by erasing a decode key (KEY) stored in the management area of the storage apparatus 20.

(4) When the storage apparatus 20 includes a password lock function, the data erase control unit 10 sets a predefined password by issuing a password setting command to the storage apparatus 20. In addition, the data erase control unit 10 sets the storage apparatus 20 into the password lock state by issuing a password lock command to the storage apparatus 20, thereby making the data in the storage apparatus 20 unreadable.

Note that such a password lock function is supported by storage apparatuses compliant with the ATA standard, for example.

In addition, the password that is set may be generated automatically by applying a predetermined rule (password generating rule) to information, such as the serial number of the storage apparatus 20 for example. Note that such a technique for setting a password may be embodied by various techniques.

Alternatively, if a "secure erase" command is not used, such as if the storage apparatus 20 does not support a "secure erase" command as described above, the data erase control unit 10 makes a control on the storage apparatus 20, in an attempt to achieving the processing similar to the processing of (1)-(4) described above. In other words, the data erase control unit 10 performs at least one of the following processing (1)-(4) on the storage apparatus 20:

(1) WRITE requests are issued for writing a preset data pattern (overwriting data) to an area on the storage apparatus 20 for a certain multiple times.

In such a data erase technique using overwriting data, an insignificant string, such as ALL 0, ALL f, 01234567 . . . abcdef . . . , may be used as overwriting data, for example. Alternatively, erase techniques compliant with the US Department of Defense format (DOD 5220.22-M) or the NSA (US National Security Agency) may be used, for example.

In addition, prior to issuing such a WRITE request, the data erase control unit 10 obtains information, such as the size of the disk area, by issuing, to the storage apparatus 20, a command for making an inquiry to a device, such as "inquiry" command in accordance with the SCSI standard, for example.

(2) When the storage apparatus 20 is an SSD, an entire erase command for all areas is issued.

(3) The storage apparatus 20 includes an encryption function for encrypting stored data. When the data concerned is encrypted, decoding of the data is prevented by issuing a command to erase a decode key (KEY) stored in the management area of the storage apparatus 20.

Note that the decoding key in the management area may be overwritten with a different key, instead of executing a command to erase the decoding key.

(4) When the storage apparatus 20 supports a password lock function, the data erase control unit 10 sets a predefined password by issuing a password setting command to the storage apparatus 20. In addition, the data erase control unit 10 sets the storage apparatus 20 into the password lock state by issuing a password lock command to the storage apparatus 20.

The LED 14 is an LED indicating the operating state of the storage apparatus mounting frame 100 by lighting up or out and is provided at the position on the storage apparatus mounting frame 100 where the operator can see, and its emission is controlled by the LED lighting control unit 12. The LED 14 is embodied by the LED light emitting module 114 and the light guiding unit 101d described above, for example.

The LED lighting control unit 12 is adapted to control emission of the LED 14, and is adapted to notify the operator that the data erase control unit 10 is performing the processing for making the data in the storage apparatus 20 unreadable by lighting up or out the LED 14. Note that the control of emission of the LED 14 by the LED lighting control unit 12 can be embodied by various well-known techniques, and the description thereof will be omitted.

In this embodiment, the functions as the data erase control unit 10, the route switch unit 11, the LED lighting control unit 12, and the power supply control unit 13 described above are embodied by the control chip 106 depicted in FIG. 4.

In the storage apparatus mounting frame 100 of the first embodiment as configured above, when an operator depresses the switch S1, a data erase instruction signal (read prevention instruction) is sent from the switch S1 to the data erase control unit 10.

The data erase control unit 10 instructs the route switch unit 11 to disconnect a connection route (I/O connection route; for example, SATA, SAS, SCSI, ATA, FC) between the storage apparatus 20 and the information processing apparatus.

The route switch unit 11 disconnects the connection route between the storage apparatus 20 and the information processing apparatus, as well as connecting between the data erase control unit 10 and the storage apparatus 20, in response to this instruction. Note that such a connection route between the data erase control unit 10 and the storage apparatus 20 may be connection route via interfaces (for example, SATA, SAS, SCSI, ATA, FC) commonly used in information processing apparatuses, or may be a connection route via specific interfaces, such as an interface specific to the supplier of the storage apparatus 20.

in addition, the data erase control unit 10 instructs the LED lighting control unit 12 to emit the LED 14, and the LED lighting control unit 12 starts to notify the operator that processing for read prevention control on data in the storage apparatus 20 is being executed by lighting up the LED 14 or blinking the LED 14 at a certain cycle.

For example, the data erase control unit 10 performs processing to make data in the storage apparatus 20 unreadable using:

(1) A user area in the storage apparatus 20 is overwrite erased by writing predefined overwriting data for a certain times.

(2) When the storage apparatus 20 is an SSD, entire erase for all areas are performed.

(3) A decoding key stored in the management area of the storage apparatus 20 is erased.

(4) The storage apparatus 20 is set to the password lock state.

Once the processing for read prevention control on data in the storage apparatus 20 is completed, the data erase control unit 10 instructs the LED lighting control unit 12 to control the LED 14 to use lighting pattern (for example, lighting out) indicating that the processing for read prevention control on data in the storage apparatus 20 is completed.

In addition, the data erase control unit 10 instructs the route switch 11 to disconnect the connection between the data erase control unit 10 and the storage apparatus 20. After disconnecting the connection between the data erase control unit 10 and the storage apparatus 20 in response to this instruction, the route switch unit 11 reconnects the connection route between the information processing apparatus and the storage apparatus 20.

Note that, while the storage apparatus mounting frame 100 is mounted to the storage blade apparatus 1, power supplied from the storage blade apparatus 1 is supplied to the control chip 106, the storage apparatus 20, the LED 14, and the like, and the processing for read prevention control on data in the storage apparatus 20 based on a depression of the switch S1 by the operator as described above is executed using power supplied from the storage blade apparatus 1.

In other words, while the storage apparatus mounting frame 100 of the first embodiment is attached to the storage blade apparatus 1, the power supplied from the storage blade apparatus 1 is supplied to the control chip 106, the storage apparatus 20, the LED 14, and the like under the control of the power supply control unit 13, thereby energizing the route switch unit 11, the data erase control unit 10, and the LED lighting control unit 12.

In addition, while the storage apparatus mounting frame 100 is detached from the storage blade apparatus 1, power supplied from the battery 15 is supplied to the control chip 106, the storage apparatus 20, the LED 14, and the like, and the processing for read prevention control on data in the storage apparatus 20 based on a depression of the switch S1 by the operator as described above is executed using power supplied from the battery 15.

In other words, while the storage apparatus mounting frame 100 of the first embodiment is detached from the storage blade apparatus 1, the power supplied from the battery 15 is supplied to the control chip 106, the storage apparatus 20, the LED 14, and the like under the control of the power supply control unit 13, thereby energizing the route switch unit 11, the data erase control unit 10, and the LED lighting control unit 12.

In addition, in the storage apparatus mounting frame 100, when the storage apparatus mounting frame 100 is detached from the storage blade apparatus 1, the data in the storage apparatus 20 may be automatically made unreadable.

More specifically, when the storage apparatus mounting frame 100 of the first embodiment is detached from the storage blade apparatus 1, the switch S2 detects the detachment. In response to a detection signal from the switch S2, the data erase control unit 10 processing for a read prevention control on the data in the storage apparatus 20 similar to that described above.

Note that the operator can select as to whether the processing for read prevention control on data in the storage apparatus 20 can be automatically executed (automatic read prevention) when the switch S2 detects detachment of the storage apparatus mounting frame 100 from the storage blade apparatus 1.

For example, the storage apparatus mounting frame 100 may includes a switch (such as a jumper switch or dip switch), which is not illustrated, and the operator can set whether an automatic read prevention is performed using this switch. The data erase control unit 10 detects the setting of this switch to determine whether the processing for a read prevention control on the data in the storage apparatus 20 is automatically executed.

As described above, according to the storage apparatus mounting frame 100 of the first embodiment, an operator can make data in the storage apparatus 20 unreadable by depressing the switch S1. Thus, leakage or the like of the data in the storage apparatus 20 can be prevented in a reliable manner, which improves the reliability.

In addition, since power stored in the battery 15 is supplied to the control chip 106, the storage apparatus 20, the LED 14, and the like under the control of the power supply control unit 13, the route switch unit 11, the data erase control unit 10, the LED lighting control unit 12 can function even when the storage apparatus mounting frame 100 is detached from the storage blade apparatus 1, which makes the data in the storage apparatus 20 unreadable in a reliable manner.

In other words, even when the storage apparatus 20 is detached from the information processing apparatus, the operator can make the data in the storage apparatus 20 unreadable by depressing the switch S1. Thus, when some error occurs in the storage apparatus 20, for example, the down time of the information processing apparatus can be minimized by quickly detaching that failed storage apparatus 20 from the information processing apparatus and replacing it with a new storage apparatus 20, thereby improving the reliability of the system.

In addition, by automatically executing the processing for a read prevention control on the data in the storage apparatus 20 when detachment of the storage apparatus mounting frame 100 from the storage blade apparatus 1 is detect by the switch S2, the data in the storage apparatus 20 can be made unreadable immediately, which can enhance the security level of the data in the storage apparatus 20.

For example, even when the operator fails to depress the switch S1, the data in the storage apparatus 20 can be made unreadable in a reliable manner, which reliably prevents data leakage.

For example, a storage apparatus 20 of a storage blade apparatus 1 provided in a server system in a preventive maintenance task of the server system, a maintenance engineer brings the password-locked storage apparatus 20 to a factory or a support center.

In this case, if the data erase control unit 10 sets the storage apparatus 20 in the password lock state for making the data in the storage apparatus 20 unreadable, an engineer in the factory or the like who is familiar with the password generation rule and sticks to the nondisclosure agreement tests the storage apparatus 20, such as for duplicating the error, in the factory or the like.

In other words, the data in the storage apparatus 20 can be carried from the customer's premises to the factory or the like in the password lock state, thereby securing the data.

(B) Description of Second Embodiment

Figure 6:
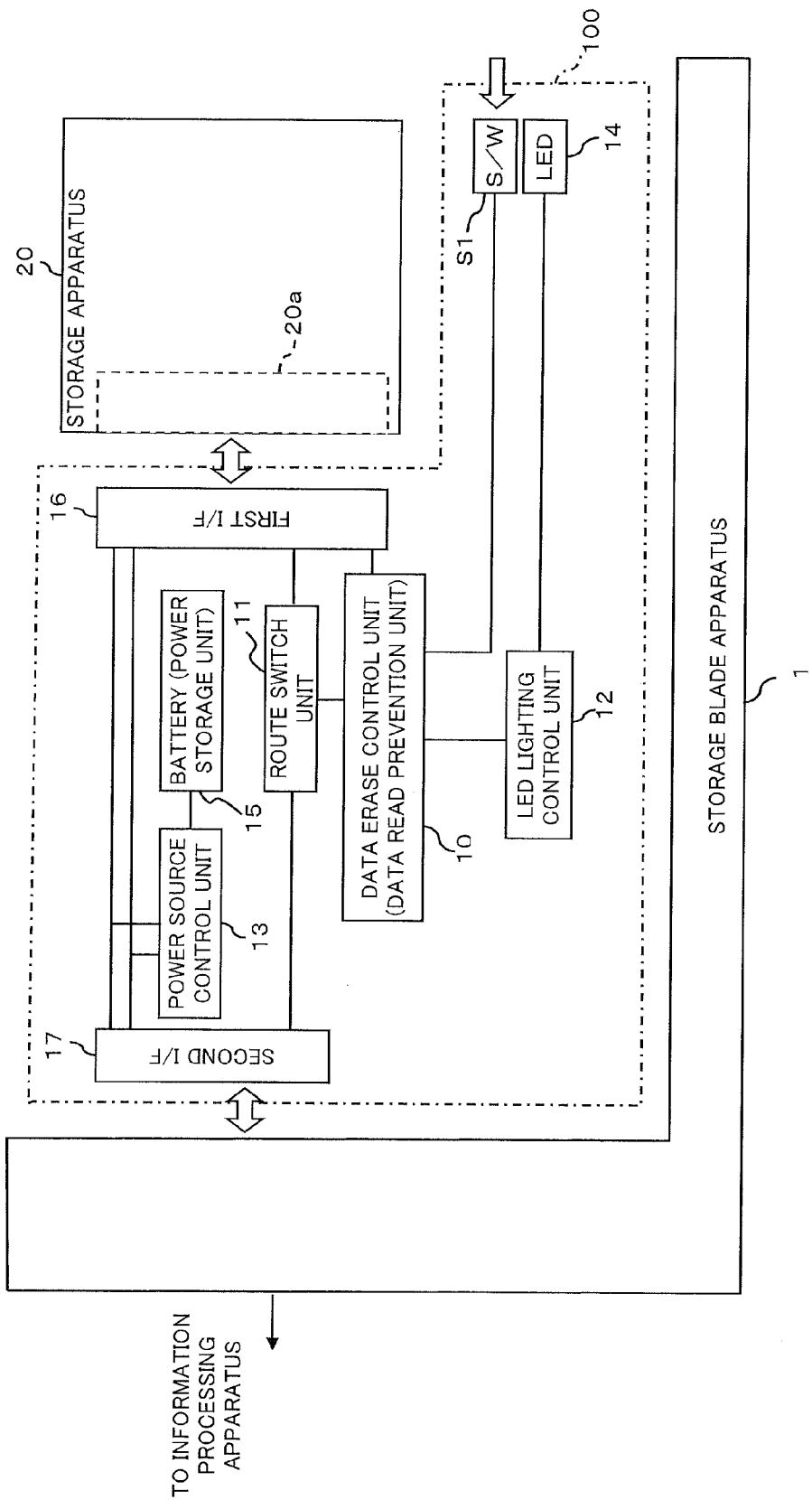
FIG. 6 is a diagram schematically illustrating the functional configuration of a storage apparatus mounting frame as a second embodiment.

FIG. 6 is a diagram schematically illustrating an example of a functional configuration of a storage system as one example of a second embodiment.

As depicted in FIG. 6, a storage apparatus mounting frame 100 as this second embodiment is constructed by omitting a switch S2 from the storage apparatus mounting frame 100 of the first embodiment, and other portions are configured similarly to the storage apparatus mounting frame 100 of the first embodiment.

Note that descriptions of the elements having the same reference symbols as the elements described previously will be emitted since they refer to the same or substantially the same elements described above.

More specifically, the storage apparatus mounting frame 100 as this second embodiment is adapted to make data in a storage apparatus 20 unreadable only when a switch S1 is depressed by an operator.

As described above, also in the storage apparatus mounting frame 100 as the second embodiment, an operator can make data in the storage apparatus 20 unreadable by depressing the switch S1 while the storage apparatus mounting frame 100 is detached from the storage blade apparatus 1. Thus, leakage or the like of the data in the storage apparatus 20 can be prevented in a reliable manner, which improves the reliability.

In addition, while the storage apparatus 20 is detached from the information processing apparatus, the data in the storage apparatus 20 can be made unreadable. Thus, when some error occurs in the storage apparatus 20, for example, the down time of the information processing apparatus can be minimized by quickly detaching that failed storage apparatus 20 from the information processing apparatus and replacing it with a new storage apparatus 20, thereby improving the reliability of the system.

Furthermore, since power stored in the battery 15 is supplied to the control chip 106, the storage apparatus 20, the LED 14, and the like under the control of the power supply control unit 13, the route switch unit 11, the data erase control unit 10, the LED lighting control unit 12 can function even when the storage apparatus mounting frame 100 is detached from the storage blade apparatus 1, which makes the data in the storage apparatus 20 unreadable.

in addition, since the data in the storage apparatus 20 is made unreadable only when the switch S1 is depressed by the operator, management of the data in the storage apparatus 20 by the operator is simplified, which is convenient.

(C) Description of Third Embodiment

Figure 7:
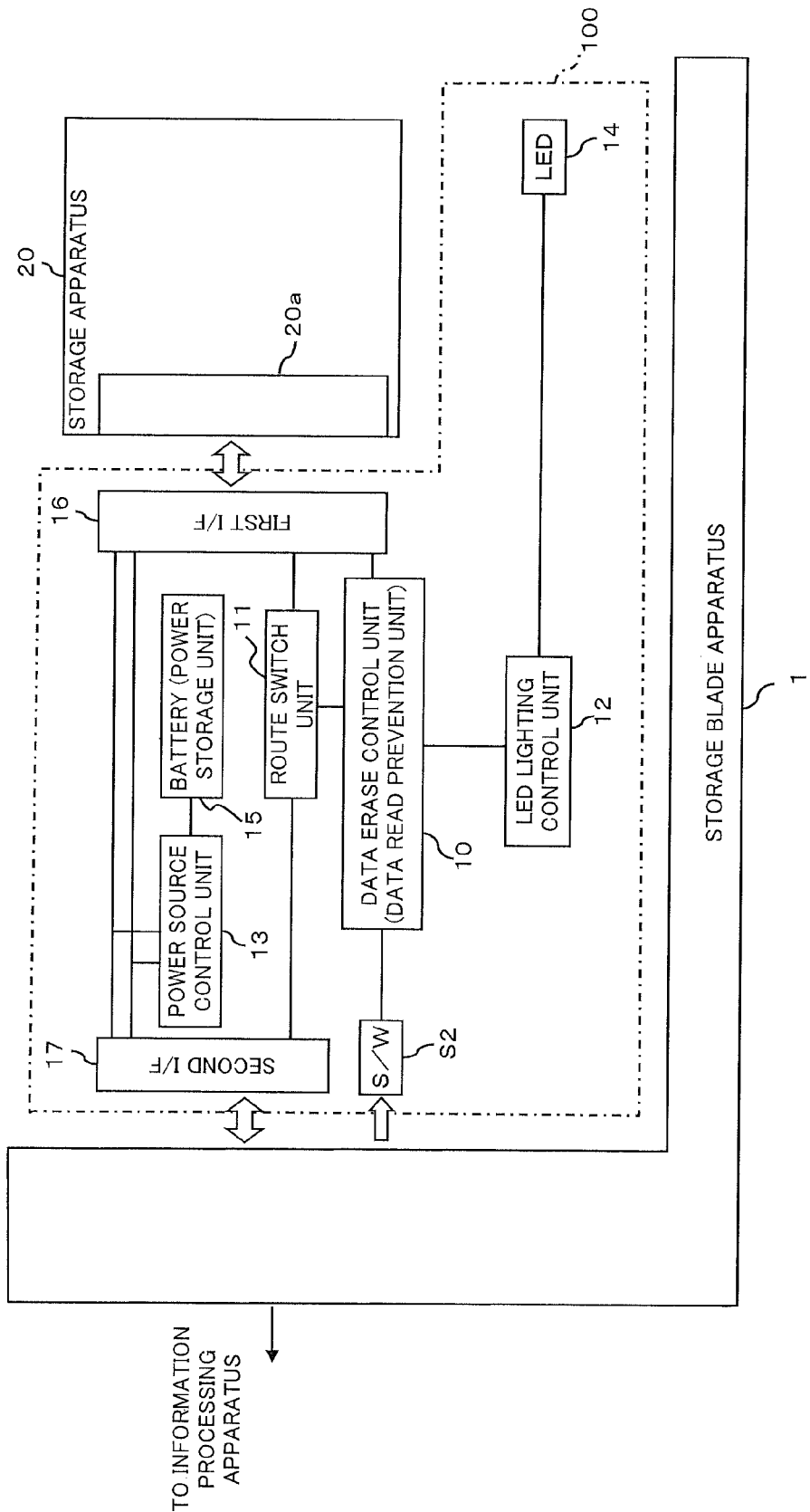
FIG. 7 is a diagram schematically illustrating the functional configuration of a storage apparatus mounting frame as a third embodiment.

FIG. 7 is a diagram schematically illustrating an example of a functional configuration of a storage system as one example of a third embodiment.

As depicted in FIG. 7, a storage apparatus mounting frame 100 as this third embodiment is constructed by omitting a switch S2 from the storage apparatus mounting frame 100 of the first embodiment, and other portions are configured similarly to the storage apparatus mounting frame 100 of the first embodiment.

Note that descriptions of the elements having the same reference symbols as the elements described previously will be omitted since they refer to the same or substantially the same elements described above.

More specifically, the storage apparatus mounting frame 100 as this third embodiment is adapted to automatically execute processing for making data in the storage apparatus 20 unreadable when detachment of the storage apparatus mounting frame 100 from the storage blade apparatus 1 is detected by a switch S2.

Thus, data in the storage apparatus 20 is quickly made unreadable when the storage apparatus mounting frame 100 is detached from the storage blade apparatus 1, which can enhance the security level of the data in the storage apparatus 20.

(D) Description of Fourth Embodiment

Figure 8:
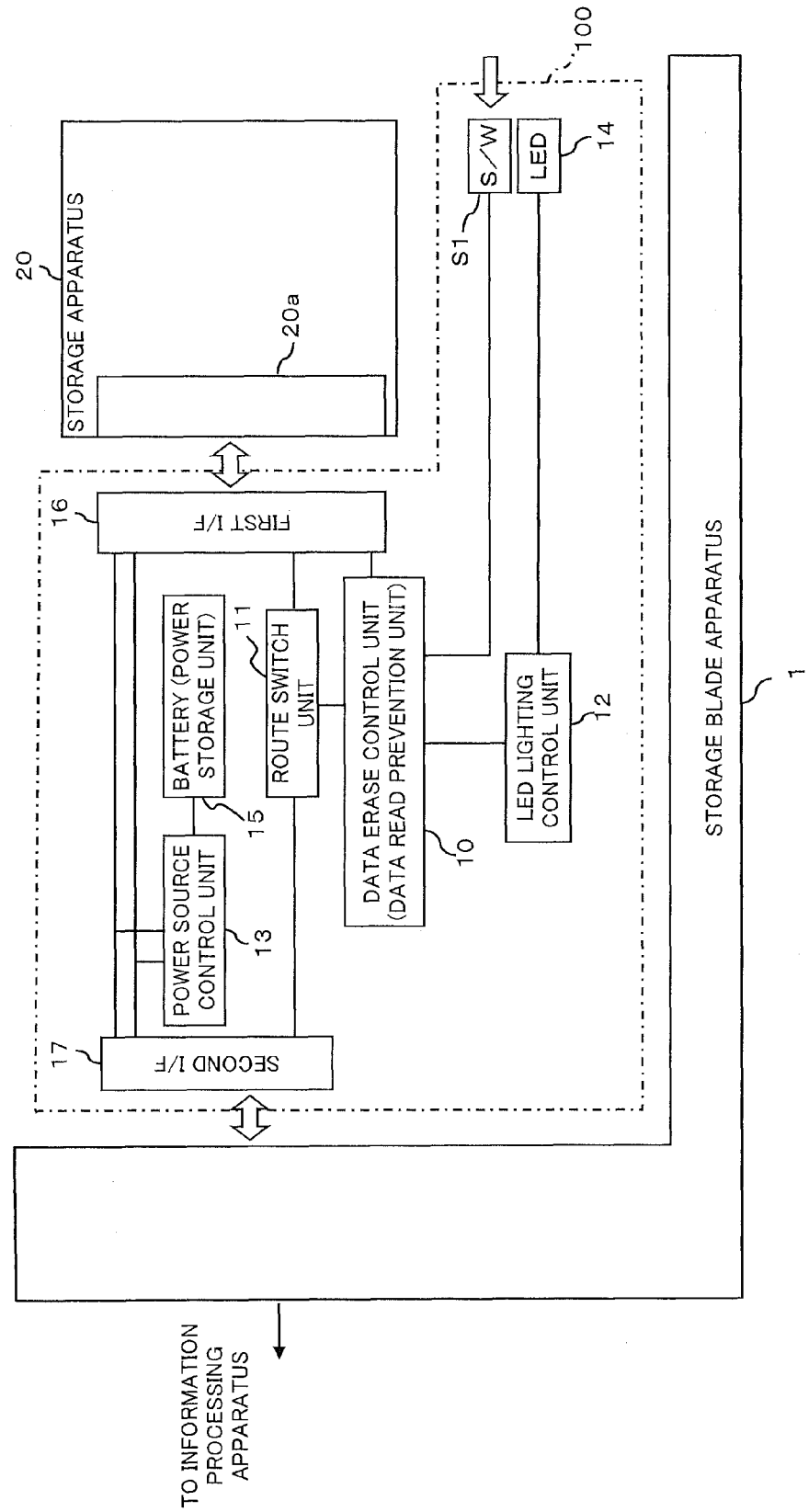
FIG. 8 is a diagram schematically illustrating the functional configuration of a storage apparatus mounting frame as a fourth embodiment.
Figure 9:
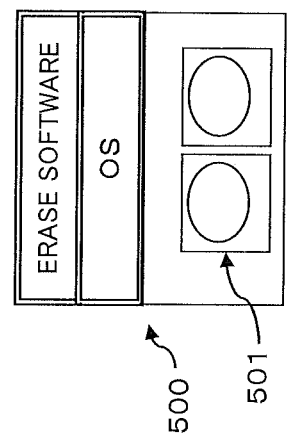
FIG. 9 is a diagram illustrating a conventional data erase technique.

FIG. 8 is a diagram schematically illustrating an example of a functional configuration of a storage system as one example of a fourth embodiment.

As depicted in FIG. 8, a storage apparatus mounting frame 100 as this fourth embodiment is constructed by omitting a switch S2 and a battery 15 from the storage apparatus mounting frame 100 of the first embodiment, and other portions are configured similarly to the storage apparatus mounting frame 100 of the first embodiment.

Note that descriptions of the elements having the same reference symbols as the elements described previously will be omitted since they refer to the same or substantially the same elements described above.

More specifically, the storage apparatus mounting frame 100 as this fourth embodiment is adapted to make data in a storage apparatus 20 unreadable only when a switch S1 is depressed by an operator while the storage apparatus mounting frame 100 is mounted to the storage blade apparatus 1.

Thus, the storage apparatus mounting frame 100 does not have to include a battery 15 or a switch S2, which helps to reduce the manufacturing cost of the storage apparatus mounting frame 100.

(E) Others

Various modifications of the disclosed techniques may be implemented without departing from the spirit of the embodiments.

For example, although the functions as the data erase control unit 10, the route switch unit 11, the LED lighting control unit 12, and the power supply control unit 13 are embodied by the control chip 106 constructed as an integrated circuit in the embodiments set forth above, this is not limiting. For example, they may be embodied by a CPU (Central Processing Unit) executing programs stored in a memory, and various modifications may be practiced without departing the spirit of the present embodiments.

in addition, the examples which storage apparatus mounting frames 100 are attached to the storage blade apparatus 1 have been described in the embodiments set forth above, this is not limiting. For example, storage apparatus mounting frames 100 may be directly attached to slots provided in an information processing apparatus, or may be attached to a rack mount storage device, which is not a blade, and various modifications may be practiced without departing the spirit of.

In addition, overwriting data (data pattern) used in the data erase control unit 10 may be set by an operator to any desired data, and an input device for setting the data pattern may be provided.

The switch S1 described above may be used as such an input device, and the data pattern may be selected by varying the depression timing or depression time of the switch S1.

In addition, in the case where the data erase control unit 10 overwrite erases data in a storage apparatus 20 using overwriting data, a predefined portion of the data may be used for the overwrite erase and various modifications may be practiced without departing the spirit of.

Note that those ordinary skilled in the art can practice and manufacture a storage device mounting frame from the disclosure of each embodiment described above.

In accordance with the storage apparatus mounting frame, the storage extension apparatus, and the method of controlling a storage apparatus described above, an operator can make data in the storage apparatus unreadable by depressing the input device. Thus, leakage or the like of the data in the storage apparatus can be prevented in a reliable manner, which improves the reliability.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. A storage apparatus mounting frame that is configured to be able to hold a storage apparatus storing data, and is configured to be removably attached to a storage extension apparatus connecting to an information processing apparatus, the storage apparatus mounting frame comprising:
    a storage apparatus attachment portion that secures the storage apparatus to the storage apparatus mounting frame;
    an operation switch that inputs a read prevention instruction for the storage apparatus when an operator depresses the operation switch;
    a detachment detection switch that detects detachment of a storage apparatus mounting frame from the information processing apparatus, and inputs the read prevention instruction for the storage apparatus;
    a data read prevention processing unit that makes data stored in the storage apparatus unreadable in response to the read prevention instruction inputted from the input device at least a portion of data stored in the storage apparatus unreadable in response to the read prevention instruction inputted from the operation switch or the detachment detection switch; and
    a route switch unit adapted to switch between connections to the storage apparatus,
    wherein, in response to the read prevention instruction being input through the operation switch or the detachment detection switch, the data read prevention processing unit sends a connection switch instruction to the route switch unit, and
    wherein, in response to receiving the connection switch instruction from the data read prevention processing unit, the route switch unit disconnects a connection route between the storage apparatus and the information processing apparatus for connecting the data read prevention processing unit to the storage apparatus.

2. The storage apparatus mounting frame according to claim 1, wherein the data read prevention processing unit makes the stored data unreadable by overwriting at least a part of the stored data using overwriting data.

3. The storage apparatus mounting frame according to claim 1, wherein the data read prevention processing unit makes the stored data unreadable by erasing decode information stored in the storage apparatus while the stored data is encrypted.

4. The storage apparatus unit mounting frame according to claim 1, wherein the data read prevention processing unit makes the stored data unreadable by setting a password to the storage apparatus.

5. The storage apparatus mounting frame according to claim 1, wherein the data read prevention processing unit makes the stored data unreadable by performing an entire erase on a certain storage area in the storage apparatus.

6. The storage apparatus mounting frame according to claim 1, wherein the input device is configured as a detachment detection switch that detects detachment of the storage apparatus mounting frame from the storage extension apparatus.

7. The storage apparatus mounting frame according to claim 1, wherein the storage apparatus mounting frame further comprises a power supply unit that supplies power to the data read prevention processing unit while the storage apparatus mounting frame is detached from the storage extension apparatus.

8. The storage apparatus mounting frame according to claim 1, wherein the storage apparatus mounting frame further comprises a status indicator, and
the status indicator indicates a status of processing of the data read prevention processing unit.

9. A storage extension apparatus configured to be removably attached to a storage apparatus mounting frame connecting to an information processing apparatus, the storage extension apparatus comprising:
a storage apparatus that stores data and is to be connected to the information processing apparatus,
wherein the storage apparatus mounting frame includes:
a storage apparatus attachment portion that secures the storage apparatus to the storage apparatus mounting frame;
an operation switch that inputs a read prevention instruction for the storage apparatus when an operator depresses the operation switch;
a detachment detection switch that detects detachment of the storage apparatus mounting frame from the information processing apparatus, and inputs the read prevention instruction for the storage apparatus;
a data read prevention processing unit that makes at least a portion of data stored in the storage apparatus unreadable in response to the read prevention instruction inputted from the operation switch or the detachment detection switch; and
a route switch unit adapted to switch between connections to the storage apparatus,
wherein, in response to the read prevention instruction being input through the operation switch or the detachment detection switch, the data read prevention processing unit sends a connection switch instruction to the route switch unit to switch between the connections, and
wherein, in response to receiving the connection switch instruction from the data read prevention processing unit, the route switch unit disconnects a connection route between the storage apparatus and the information processing apparatus for connecting the data read prevention processing unit to the storage apparatus.

10. A controlling method of a storage apparatus that is secured to a storage apparatus mounting frame, stores data and is connected to an information processing apparatus, the controlling method comprising:

inputting a read prevention instruction for the storage apparatus to an operation switch or a detachment detection switch provided in the storage apparatus mounting frame;
in response to the read prevention instruction being inputted from the operation switch or the detachment detection switch, sending a connection switch instruction to a route switch unit that switches between connections to the storage apparatus;
disconnecting a connection route between the storage apparatus and the information processing apparatus; and
making at least a portion of data stored in the storage apparatus unreadable,
wherein the storage apparatus mounting frame is configured to be able to hold the storage apparatus and to be removably attached to a storage extension apparatus connecting to an information processing apparatus, the storage apparatus mounting frame including:
a storage apparatus attachment portion that secures the storage apparatus to the storage apparatus mounting frame;
the operation switch that inputs the read prevention instruction for the storage apparatus when an operator depresses the operation switch;
the detachment detection switch that detects detachment of the storage apparatus mounting frame from the information processing apparatus, and inputs the read prevention instruction for the storage apparatus;
a data read prevention processing unit that makes at least a portion of data stored in the storage apparatus unreadable in response to the read prevention instruction inputted from the operation switch or the detachment detection switch; and
a route switch unit adapted to switch between connections to the storage apparatus,
wherein, in response to the read prevention instruction being input through the operation switch or the detachment detection switch, the data read prevention processing unit sends the connection switch instruction to the route switch unit, and
wherein, in response to receiving the connection switch instruction from the data read prevention processing unit, the route switch unit disconnects the connection route between the storage apparatus and the information processing apparatus for connecting the data read prevention processing unit to the storage apparatus.

* * * * *